Patented Oct. 1, 1935

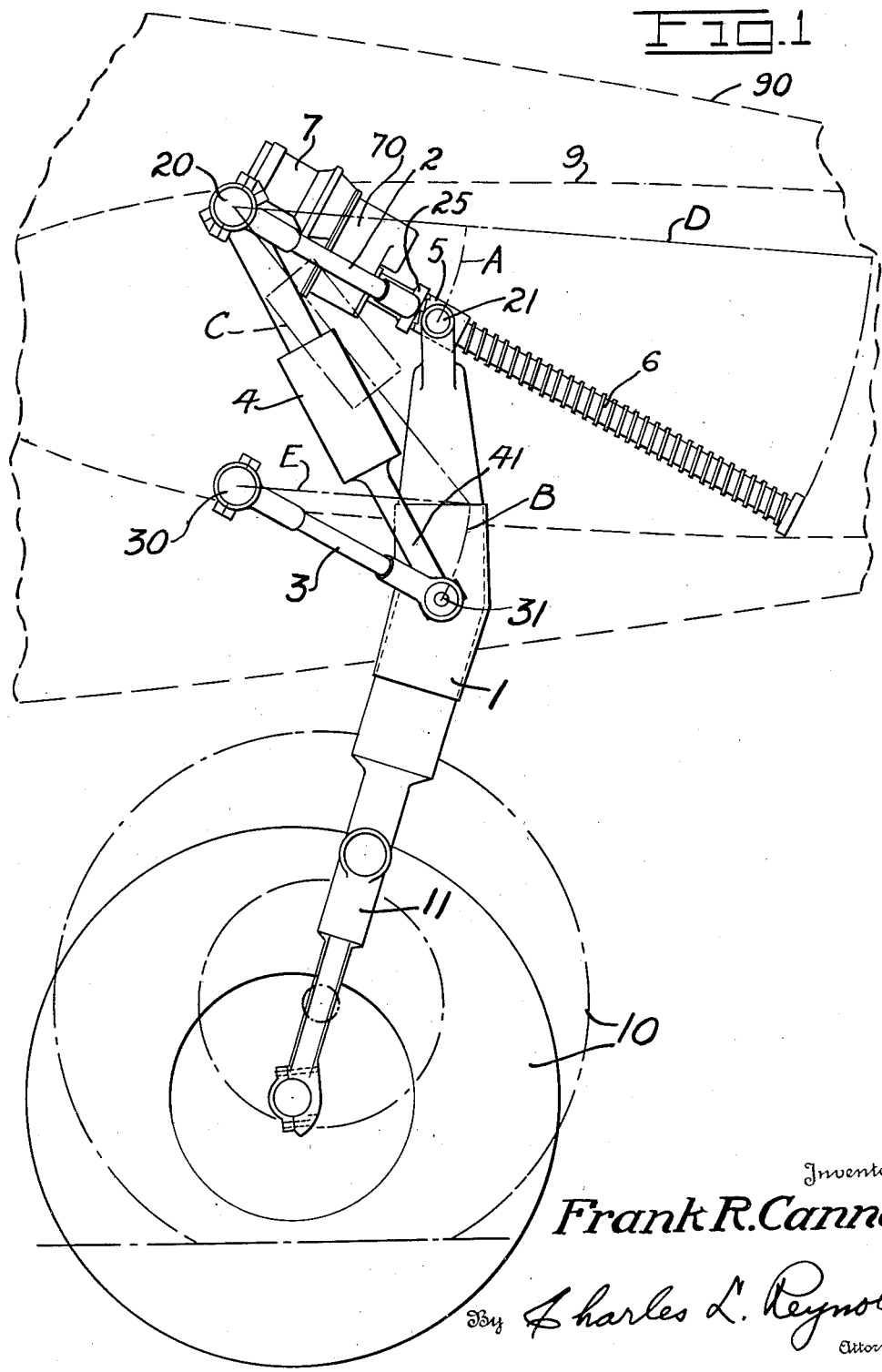

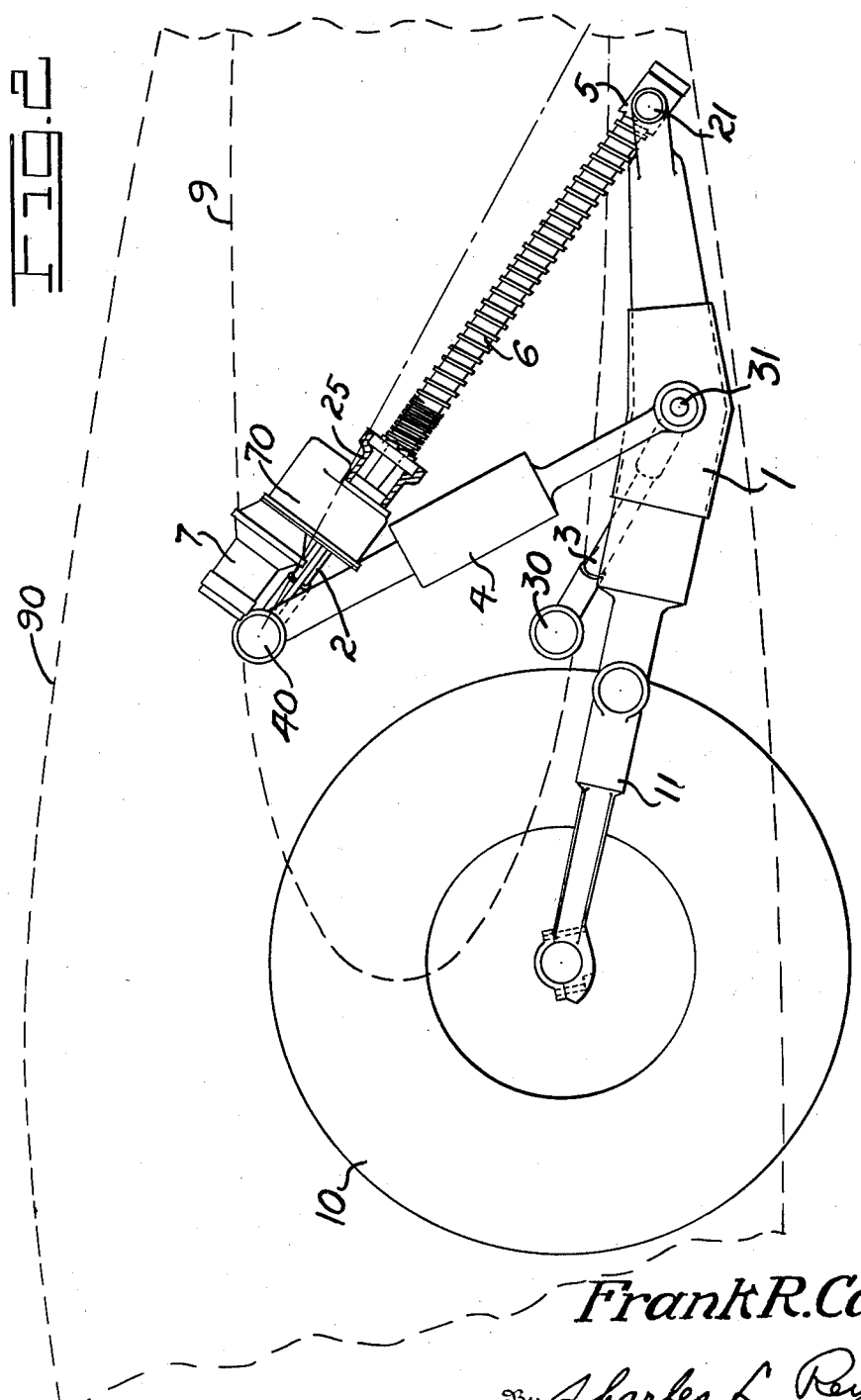

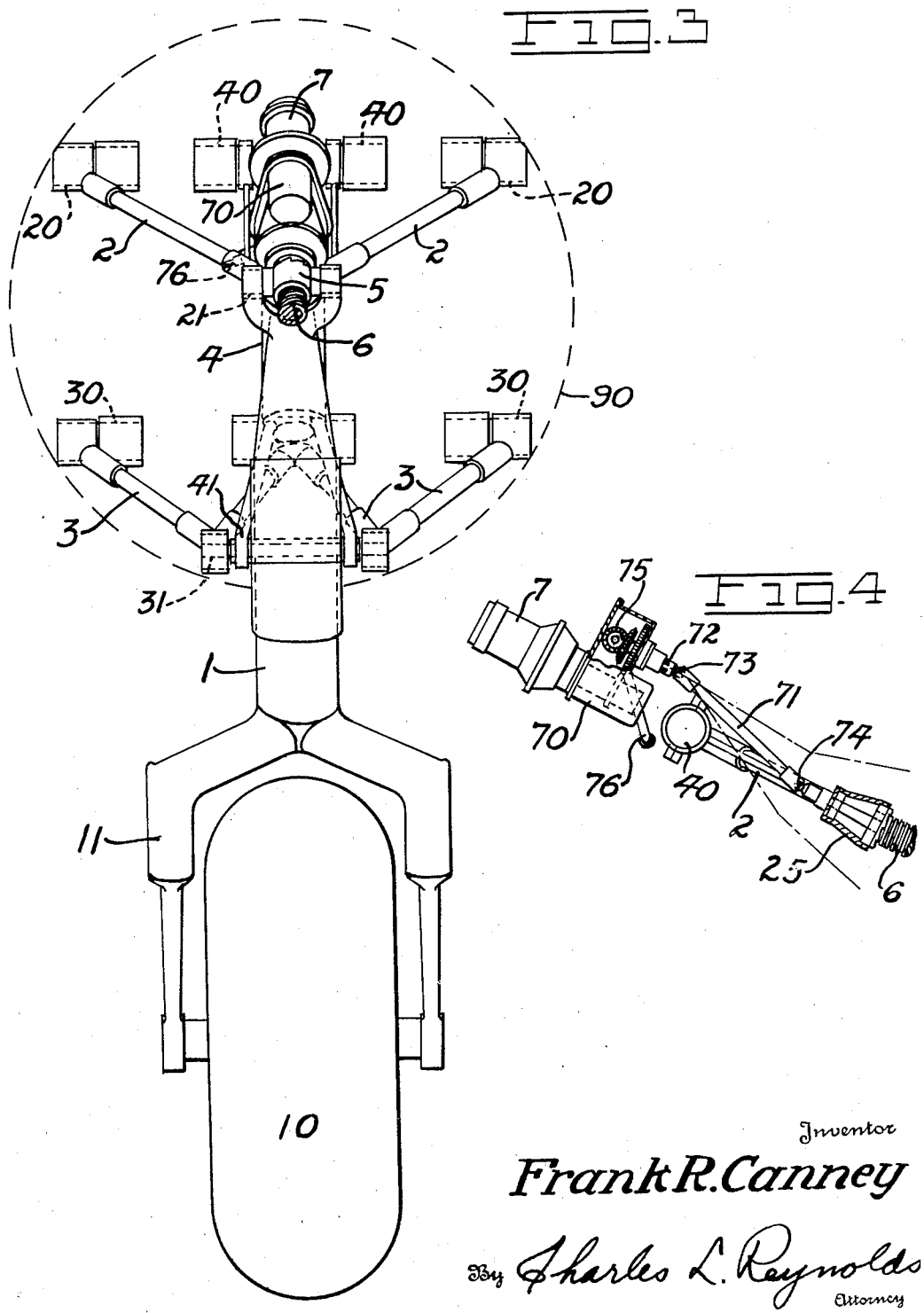

2,015,920

UNITED STATES PATENT OFFICE 2,015,920

RETRACTABLE LANDING GEAR

Frank R. Canney, Seattle, Wash., assignor to Boeing Airplane Company, Seattle, Wash., a corporation of Washington Application July 3, 1934, Serial No. 733,602

12 Claims. (Cl. 244—2)

My invention relates to a landing gear for airplanes, and more especially to a landing gear which is retractable.

The present landing gear is designed for incorporation in an engine nacelle—mounted upon a wing, although by no means limited only to such installations, and it is an object to devise a landing gear for such purposes which can be incorporated within such a nacelle, so that only a small portion projects from it when extended, and of such character that substantially the entire landing gear and wheel can be swung upward into the nacelle to reduce the drag in flight.

It is a further object to provide such a landing gear which can incorporate a shock absorbing unit, which unit will resist upwardly acting stresses caused by landing or taxiing, and which will serve as part of the support for the landing gear and as a fulcrum about which it can be swung in retracting.

It is also an object to devise such a landing gear which will but slightly alter the position of the center of gravity of the plane as a whole in its movement between retracted and projected positions.

It is a further object to devise such a landing gear which can be built as a unit, and which can be removed or installed in a minimum of time and with a maximum of convenience.

Other objects, particularly such as pertain to structural details, will be clear as the specification progresses.

My invention comprises the novel parts and their novel combination and arrangement, all as shown in the accompanying drawings, described in the specification, and particularly pointed out by the claims which terminate the same.

In the accompanying drawings I have shown my invention embodied in a form of construction which is at present preferred by me.

Figure 1 is a side elevation of the landing gear in its fully extended position, preparatory to landing, and Figure 2 is a side elevation of the landing gear in its fully retracted position.

Figure 3 is a rear elevation of the landing gear in its projected position, the retracting screw being broken off.

Figure 4 is a side elevation of a detail of the retracting mechanism, showing a modified form.

It is intended that the present landing gear shall be of such character that it can be substantially wholly incorporated within a nacelle, indicated at 90, mounted upon a wing, the outline of which is shown at 9, and the entire gear is so constructed that it can be mounted by two pivots, indicated at 20 and 30, upon the forward wing spar, which has been omitted for clearer illustration. It is therefore easily mounted or dismounted as a unit.

A rigid strut 1 forms the principal element of the landing gear. This strut is arranged generally upright, and the wheel 10 is suitably mounted at the lower end thereof, as for example in the fork 11 (see Figure 3). This strut is supported from the airplane structure by devices which permit it, when subjected to landing or taxiing stresses, to move substantially in the direction of its length, and as a convenient means of accomplishing this I have shown parallel links 2 and 3, pivotally mounted upon the airplane structure—for instance, upon the wing spar. These links in themselves may be suitably braced, and thus the lower link 3 has been shown in Figure 3 as of a W form, and the upper link 2 is of somewhat similar form, though it more nearly resembles a V. The lower link is pivotally connected at 31 to the upright strut 1 at a point intermediate the ends of the strut, and the upper end of the upright strut 1 may be considered as pivotally connected at the point 21 to the upper link 2, although, as will appear later, the connection is indirect and movable. When parts are thus disposed in the projected position, as shown in Figures 1 and 3, landing or taxiing stresses cause upward movement of the strut 1, the points 21 and 31 moving along the dot-and-dash lines indicated at A and B, respectively, in Figure 1.

In the design shown herein it is preferred that the strut 1 move in the direction of its length, but if in any case it is preferred that it be caused to swing about 21 or 31 as a fulcrum, in yielding to upward stresses, this may be accomplished by changing the relative lengths of the links 2 and 3, as is readily understood. While I have termed these parallel links, therefore, it will be understood as within the scope of my invention to make them somewhat unequal in length, for such purposes as I have just mentioned.

To resist upward stresses a shock absorbing unit, which may be the usual oleo unit, indicated at 4, is connected from the strut to a fixed point upon the airplane structure, and for convenience the lower end of the oleo unit may be forked, as indicated at 41, and connected to the strut at the pivot 31, and the upper end of the oleo unit may be pivotally connected to the airplane structure at the point 40 coaxial with the pivots 20 of the upper links. Thus as vertical movement of the strut 1 takes place the oleo unit swings between the full line position of Figure 1 to a limiting position, indicated by the dot-and-dash lines C in Figure 1.

Now for retracting the wheel 10 I provide a nut 5 threaded upon a screw 6. The nut 5 carries the pivot members 21, previously referred to, and the screw 6 is swiveled in the link 2, as may be seen in Figure 4, so that the screw is in effect an extension of the link 2. The limit of swing of the links 2 and 3 and of the screw 6 are shown by the dot-and-dash lines D, representing the limit of the link 2 and screw 6, and E, representing the limit of swing of the link 3.

Upon rotation of the screw 6 the nut 5, threaded thereon, is caused to move away from the point 20, and thereby to effect swinging movement of the strut 1 about the point 31. Since retraction would only occur when the plane is in flight, the shock absorbing unit will be extended, under the weight of the wheel, to the limit of its extension; the shock absorber has incorporated within it means for limiting this extension to the full line position of Figures 1 and 2. The point 31 then forms a fixed fulcrum, but the screw 6 can swing about the pivot 20, and as the nut moves outwardly along the screw the strut is swung from the full line position of Figure 1 to the position of Figure 2, causing the wheel 10 to move upwardly into a recess provided within the under side of the nacelle 90. Since all the links and the screw are contained within the nacelle, and since the action just described causes the strut 1 to swing up into the nacelle, there is left projecting only a small portion of the wheel and tire, although the nacelle may be so designed and parts may be so mounted that all parts will be enclosed within the nacelle in the retracted position.

The screw may be rotated in any convenient manner. Preferably a motor 7 is mounted upon the link 2 to swing therewith, and is connected through a gear box 70 directly to the screw 6. The motor may be a reversible motor or any convenient clutch means (not shown) may be provided for reversing the direction of rotation of the screw. The inner end of the screw is shown as double threaded, thereby giving the greatest strength in resisting landing stresses, though the remainder of the screw is single threaded only to lessen the friction. The nut 5 and the member 25 upon the link abut to limit movement of the nut along the screw, and may be provided with cooperating teeth or shoulders to definitely limit movement of the nut and to prevent binding.

It may in some instances be preferable to mount the motor 7 fixedly upon the airplane structure, and to connect it to the screw by a flexible drive shaft will permit the swinging of the screw required during the retracting and during yielding to landing and taxiing stresses. Such an arrangement is shown in Figure 4, and the fixedly mounted motor 7 is connected through the gear box 70 to a shaft 71, through a splined connection at 72 and universal joints at 73 and 74. In this form, and in the previously described form as well, there may be provided means for manual operation of the retracting gear, in case of emergency, such means being illustrated by the gear 75 operable through a flexible shaft 76 or like means extending to the pilot's station.

What I claim as my invention is:

1. A retractable landing gear comprising, in combination, an upright strut, a pivotal mounting for said strut intermediate its ends, means to anchor its upper end, said pivotal mounting and said anchoring means being each movable in a generally upright path under landing or taxiing stresses, a shock absorber unit connected to the strut intermediate its ends and to a fixed point spaced from the anchoring means, and means to displace said anchoring means to swing the strut about said pivotal mounting.

2. A landing gear comprising, in combination, an upright strut, parallel links extending longitudinally of the plane and mounted thereon, one being connected to the strut intermediate its ends and the other to the upper end of the strut, a shock absorber unit extending from the point of connection of one link to the strut, to the mounting of the other link upon the airplane, and means to displace the upper end of the strut longitudinally of the plane, to swing the strut about the connection to the lower link.

3. A retractable landing gear comprising, in combination, an upright strut, two parallel links extending longitudinally of the plane and mounted thereon, one being connected to the strut intermediate its ends, and the other to the upper end of the strut, a shock absorber unit having limited extension connected at one end to the strut at the connection of the lower link, and at its other end to a fixed point spaced above the opposite end of such link, and means to displace the upper end of the strut along the upper link, away from its fixed mounting, to swing the strut about its connection to the lower link and shock absorber unit.

4. The combination of claim 3, the upper link comprising a screw, and a nut threaded thereon and carried by the strut, and means to rotate said screw, the whole constituting the connection between the strut and upper link, and the displacing means.

5. A retractable landing gear for airplanes comprising, in combination, an upright strut, two parallel links extending substantially longitudinally of the plane and mounted thereon, one being connected to the strut intermediate the ends of the latter, and the other having a screw swiveled therein, a nut threaded on said screw and connected to the upper end of said strut, and means to rotate said screw to effect swinging of the strut about its connection to the lower link.

6. A retractable landing gear for airplanes comprising, in combination, an upright strut, two parallel links extending substantially longitudinally of the plane and mounted thereon, one being connected to the strut intermediate the ends of the latter, and the other having a screw swiveled therein, a nut threaded on said screw and connected to the upper end of said strut, means to limit downward swinging of the lower link, and means to rotate said screw to effect swinging of the strut about its connection to the lower link.

7. A retractable landing gear for airplanes comprising, in combination, an upright strut, two parallel links extending substantially longitudinally of the plane and mounted thereon, one being connected to the strut intermediate the ends of the latter, and the other having a screw swiveled therein, a nut threaded on said screw and connected to the upper end of said strut, means including a shock absorber unit of limited extension for limiting downward swinging of the lower link, but yieldable under the influence of landing or taxiing stresses to permit upward swinging of the links, and means to rotate said screw to effect swinging of the strut about its connection to the lower link.

8. A retractable landing gear for airplanes comprising, in combination, an upright strut, two parallel links extending substantially longitudinally of the plane and mounted thereon, one being connected to the strut intermediate the ends of the latter, and the other having a screw swiveled therein, a nut threaded on said screw and connected to the upper end of said strut, means to limit downward swinging of the lower link, and a motor mounted upon the upper link, and operatively connected to said screw to rotate it, thereby to effect swinging of the strut about its connection to the lower link.

9. A retractable landing gear for airplanes comprising, in combination, an upright strut, two parallel links extending substantially longitudinally of the plane and mounted thereon, one being connected to the strut intermediate the ends of the latter, and the other having a screw swiveled therein, a nut threaded on said screw and connected to the upper end of said strut, means to limit downward swinging of the lower link, and a motor fixedly mounted adjacent to the fixed pivot of the upper link, and operatively connected to said screw to rotate it, thereby to effect swinging of the strut about its connection to the lower link.

10. A retractable landing gear for airplanes comprising, in combination with an airplane structure, an upright strut, means supporting the same for movement substantially in the direction of its length, including a connection intermediate its ends, shock absorbing means of limited extension there connected to the strut and resisting upward movement of the strut, and means to impress a force upon the shock absorbing means, through the strut, to extend the shock absorbing means to the limit of its extension, thereby to form a fulcrum, and to swing the strut upward about such fulcrum.

11. A retractable landing gear for airplanes comprising, in combination, an upright strut, a pivotal mounting disposed in a vertical plane substantially parallel to the longitudinal axis of the airplane and attached to said strut intermediate its ends, means to support the upper end of said strut, shock absorbing means interposed between said support means and said pivotal mounting, said pivotal mounting being movable in a generally upright path in response to movement of said shock absorbing means, and means incorporated in said supporting means to displace the upper end of said strut rearwardly to swing the lower strut end forwardly and upwardly in a vertical plane substantially parallel to the longitudinal axis of the airplane about said pivotal mounting, into retracted position.

12. A retractable landing gear comprising, in combination, an upright strut of fixed length, a pivotal mounting attached to said strut intermediate its ends, means to support the upper end of said strut including a screw and a nut secured on the upper strut end, threaded thereon, a shock absorber of limited movement separate from said strut and interposed between said pivotal mounting and said screw, said pivotal mounting being movable with said strut and supporting means in a generally upright path in response to movement of said shock absorber, and said shock absorber operating to limit downward movement of said pivotal mounting by movement to its limit position, and means to move said nut along said screw to swing said strut into retracted position about said pivot mounting in its lowest position as a fulcrum.

FRANK R. CANNEY.